May 12, 1925.
J. A. ESSENSON
VALVE
Filed April 25, 1922   5 Sheets-Sheet 1
1,537,530
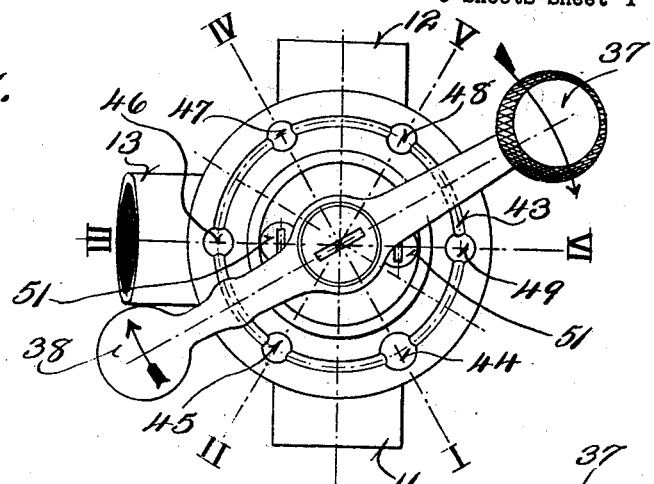
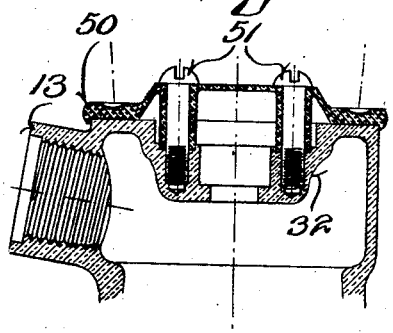
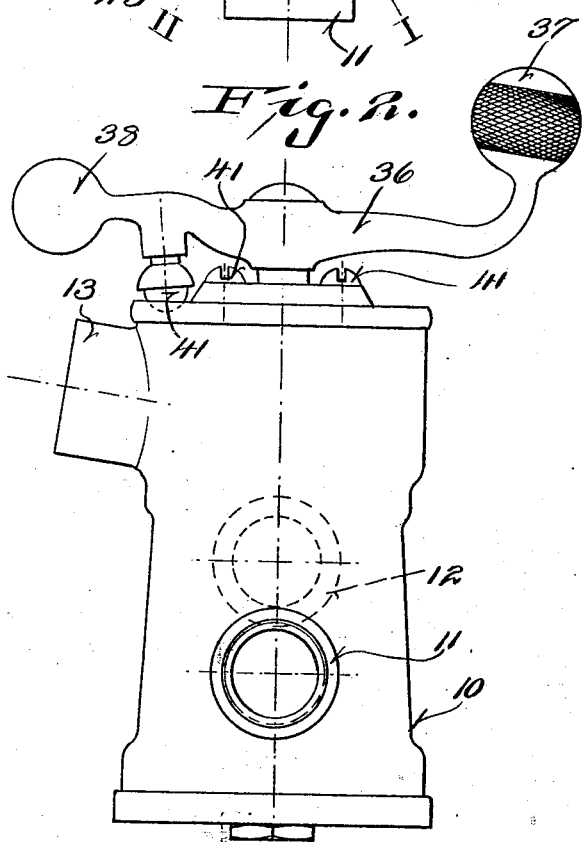
INVENTOR.
John A. Essenson
BY
ATTORNEYS May 12, 1925.
J. A. ESSENSON
VALVE
Filed April 25, 1922      5 Sheets-Sheet 2
1,537,530
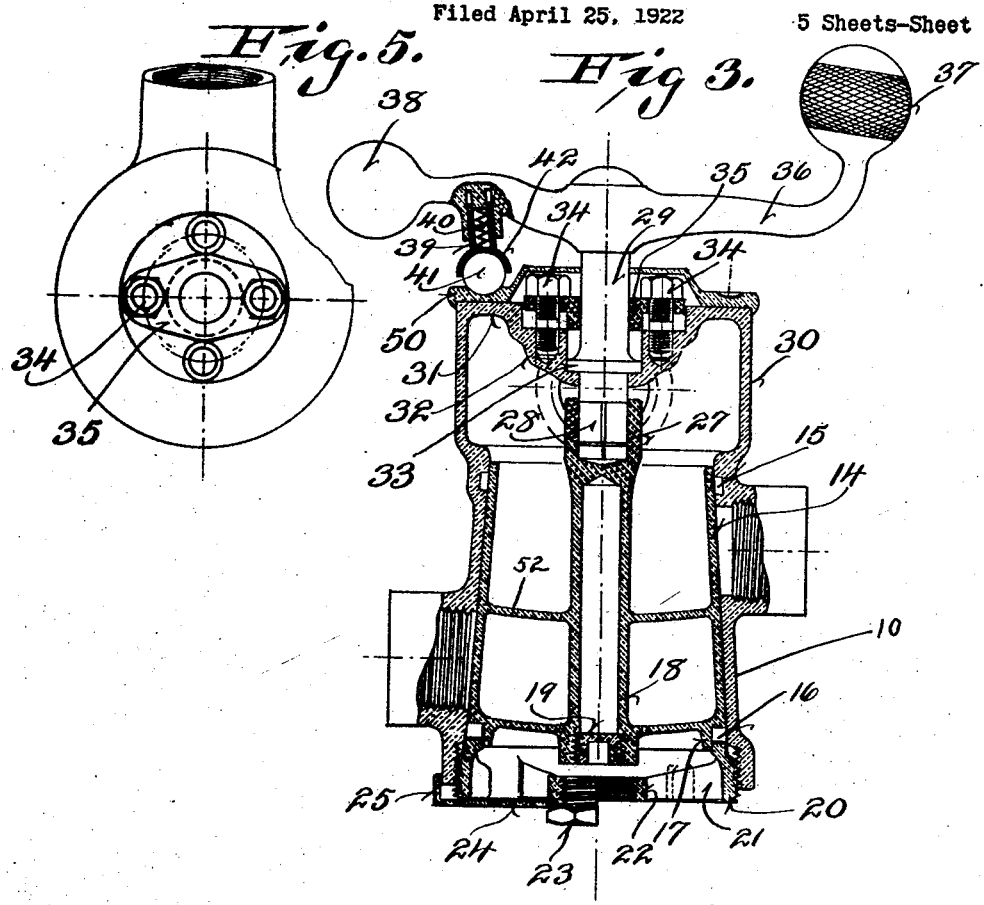
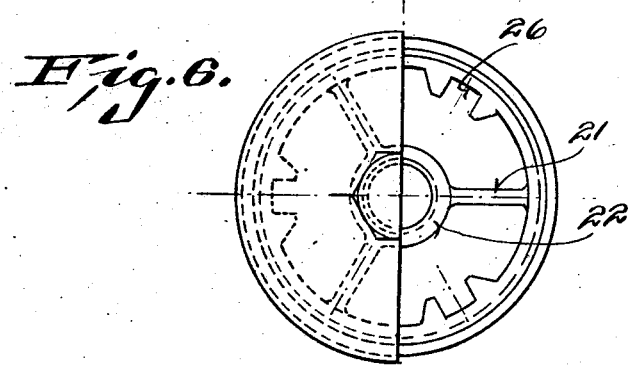
INVENTOR.
John A. Essenson
BY
ATTORNEYS May 12, 1925. 1,537,530
J. A. ESSENSON
VALVE
Filed April 25, 1922   5 Sheets-Sheet 3

INVENTOR.
John A. Essenson
BY
ATTORNEYS

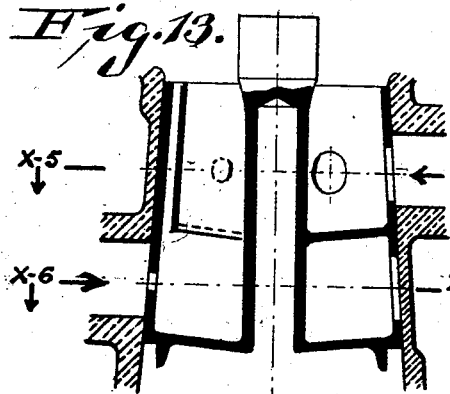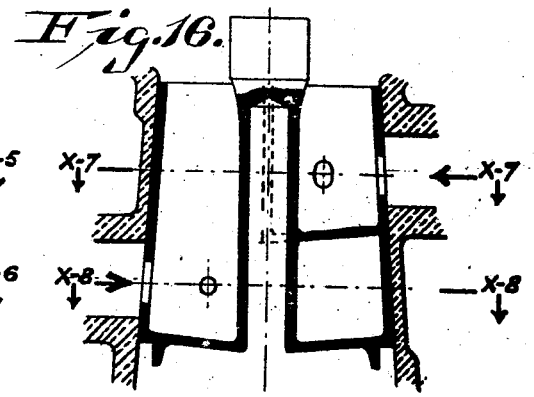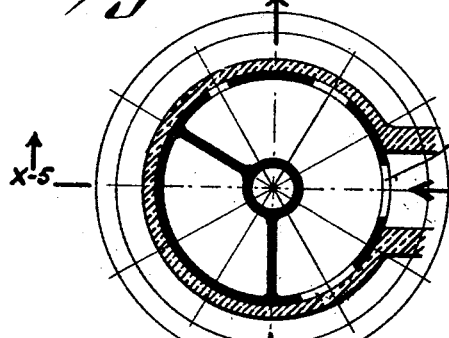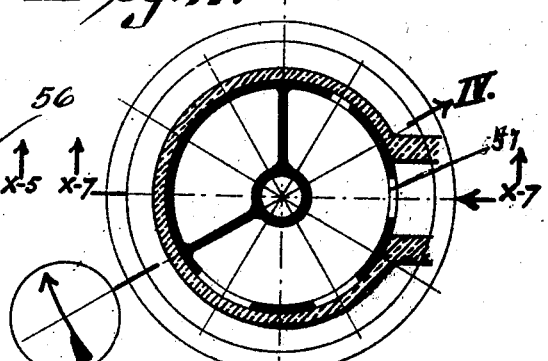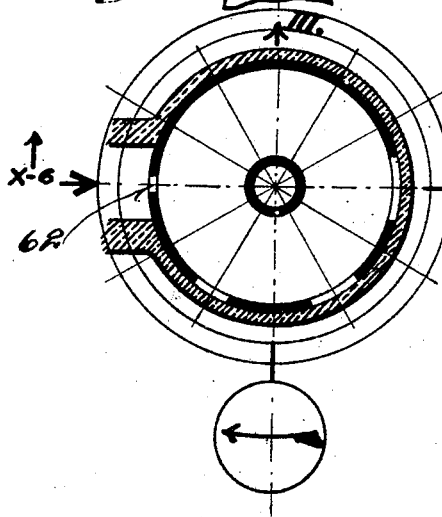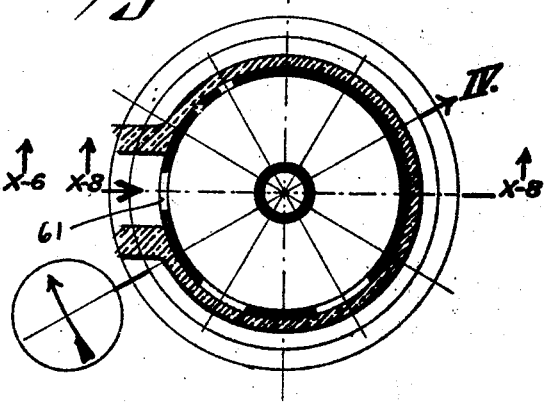

May 12, 1925. 1,537,530
J. A. ESSENSON
VALVE
Filed April 25, 1922 5 Sheets-Sheet 5
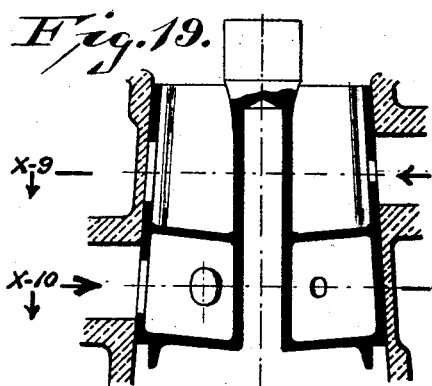
Fig. 19.
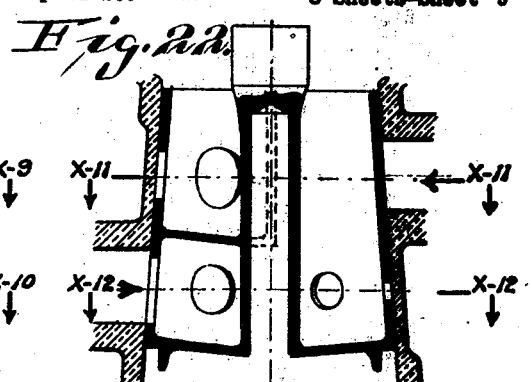
Fig. 22.
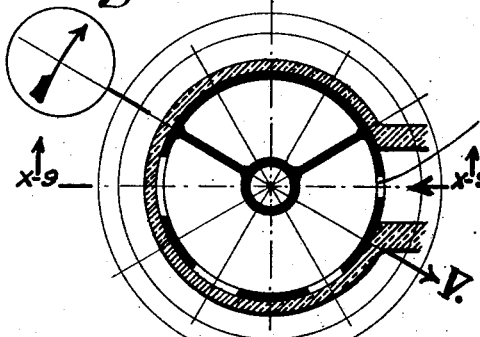
Fig. 20.
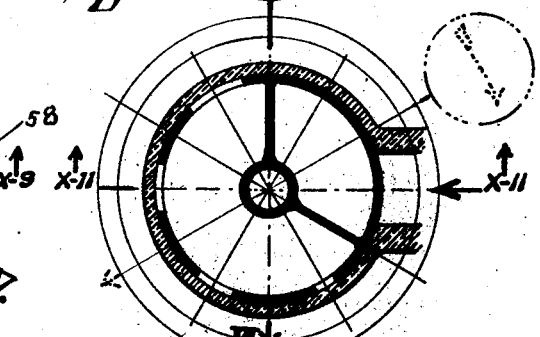
Fig. 23.
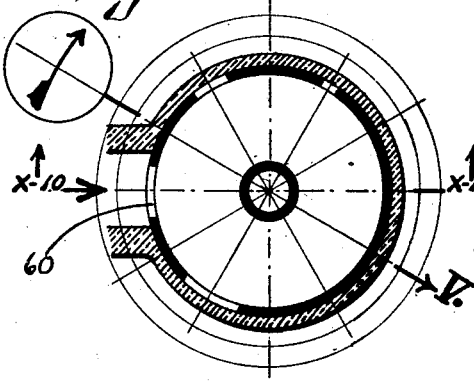
Fig. 21.
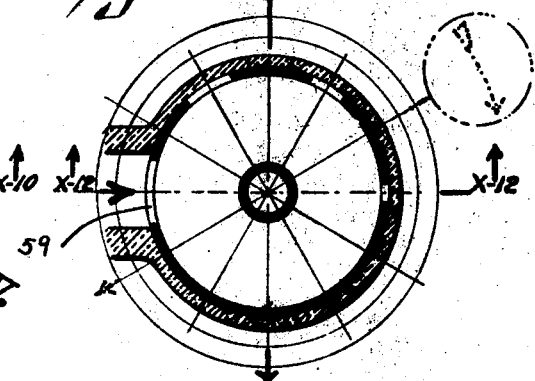
Fig. 24.
INVENTOR.
John A. Essenson
BY 
ATTORNEYS Patented May 12, 1925.

1,537,530

UNITED STATES PATENT OFFICE.

JOHN A. ESSENSON, OF MILWAUKEE, WISCONSIN.

VALVE.

Application filed April 25, 1922. Serial No. 556,431.

*To all whom it may concern:*

Be it known that I, JOHN A. ESSENSON, a citizen of the United States, and resident of Milwaukee, in the county of Milwaukee and State of Wisconsin, have invented certain new and useful Improvements in Valves; and I do hereby declare that the following is a full, clear, and exact description thereof.

The invention relates to mixing valves. It comprises a casing having hot and cold water inlets and an outlet, a valve, and a handle for rotating the valve, the valve having cold and hot water chambers separated by partitions, the water being admissible to each of the chambers selectively through apertures of varying sizes, whereby the quantity of hot or cold water admitted is controlled.

The primary object of the invention is the provision of conveniently manipulatable mechanism for accurately determining the temperature of out-flowing water. By the mere movement of the handle, water may be turned on having a maximum lowest temperature. By a further movement of the handle in the same direction, the valve exposes a small hot water inlet opening and presents a more restricted opening for the cold water, the hot and cold streams being mixed in a mixing chamber and ejected at a slightly higher temperature than the lowest temperature which is obtainable at first position. A further movement of the handle in the same direction presents a slightly larger opening for the hot water and a smaller one for the cold, the two streams being mixed to produce a still warmer degree of out-flowing water.

The arrangement is such that the hot water is thoroughly mixed with the cold and when the handle is moved from one position to another, there is a complete cut-off, so that the operator is enabled to definitely control the temperature of the out-flowing water. There is no possibility of the emission of too hot a stream, because the valve is so constructed that in order to admit the hot water, there must be such a rotation of the valve that an opening is presented for the cold water and the handle, which controls the valve, is maintained in proper positions by a dog.

This determining of the temperature involves no complicated operation, but is controlled merely by means of a handle rotating on a stem and in convenient position for manual adjustment.

An object of the invention is the provision of such a structure as will be readily adjusted to overcome the effect of wear on parts, the valve having the exterior surface of a truncated cone so that by moving it vertically, it can be brought tightly at all times against an enveloping casing. The inlet orifices in the valve are of such dimensions that in spite of the vertical adjustment of the valve, they will be presented to the inlet orifices for the hot and cold water. Thus the adjustment of the valve is effected conveniently and the operativeness of the device is in nowise impaired.

With the above and other objects in view, which will appear as the description proceeds, my invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:

Figure 1 is a plan view of the device.

Figure 2 is a side elevation thereof.

Figure 3 is a central, vertical section.

Figure 4 is a vertical section of the assembled casing and cover, parts being broken away.

Figure 5 is a plan of the casing with the cover removed showing the gland in position.

Figure 6 is a bottom plan with a part cut away.

Figures 7, 10, 13, 16, 19, and 22 are central, vertical sections of the valve and casing, showing them in different relative positions.

Figures 8, 11, 14, 17, 20, and 23 are horizontal sections, all taken on the same plane, which runs through the cold water inlet orifices.

Figures 9, 12, 15, 18, 21 and 24 are horizontal sections taken on the plane of the hot water inlet orifices.

Figure 7:
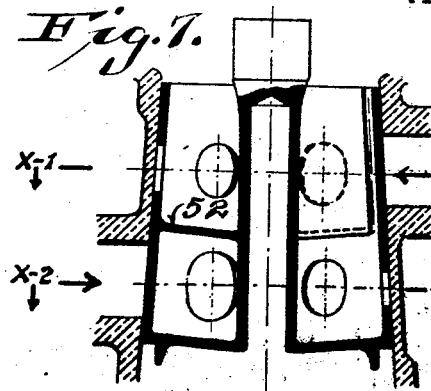
Figure 10:
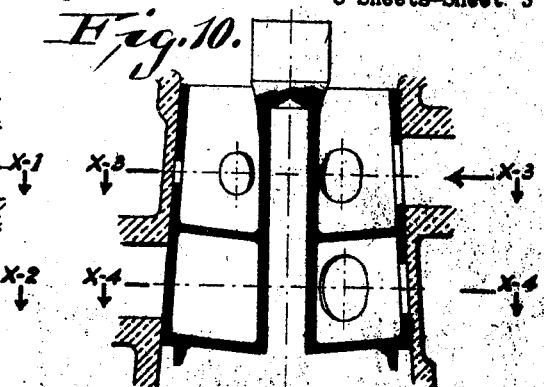
Figure 8:
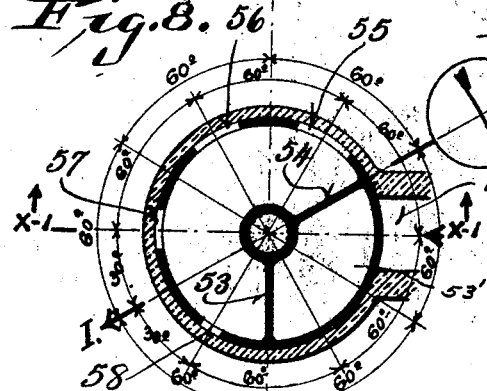
Figure 11:
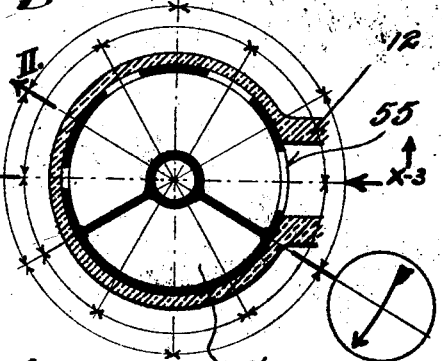
Figure 9:
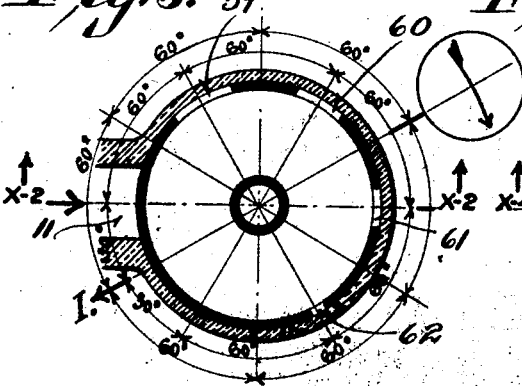
Figure 12:
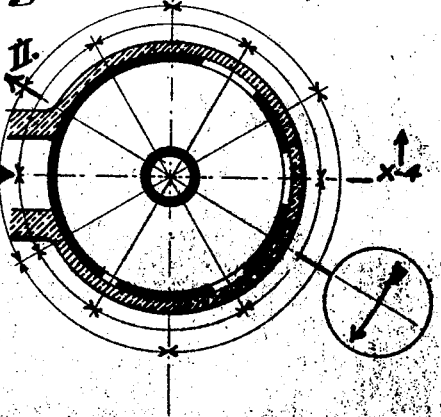

One position of the valve is shown in Figures 7, 8, and 9, another in Figures 10, 11, and 12, another in Figures 13, 14, and 15, another in Figures 16, 17, and 18, another in Figures 19, 20, and 21, and still another in Figures 22, 23, and 24.

The casing 10 is provided with a hot water inlet nipple 11, a cold water inlet nipple 12, and an outlet nipple 13. It receives a valve having an exterior wall 14 having the form of a truncated cone, its upper end terminating immediately above the annular packing 15 and its lower end being recessed to receive an annular packing 16 against which an integral flange 17 contacts. The valve has a central sleeve 18 receiving a plug 19 at its bottom and the casing 10 is threaded to receive a spanner ring 20 having spider arms 21 rigid with a concentric annulus 22 receiving a plug 23 threaded therein and maintaining a cap 24, provided with an annular flange 25 tightly in position, the cap giving the proper finish to the bottom of the device and eliminating the objection of projecting edges. The spanner ring may be adjusted by means of tools inserted in recesses 26 and may be moved upwardly by rotation to adjust packing 15 and the valve so that means are provided for taking up wear of parts.

Sleeve 18 is provided with a socket portion 27 receiving the squared end 28 of the stem 29. Casing 10 is enlarged upwardly to form a wall 30 of a mixing chamber and has an inwardly extending top portion 31 provided with an integral supporting portion 32, through which stem 29 is directed, the stem being provided with a collar 33 abutting against the supporting portion, bolts 34 being provided in the supporting portion for the adjustment of a gland 35 for stem 29.

Secured to stem 29 is a transverse head 36 terminating in a knurled handle 37 at one end and a knob 38 at the other. The transverse head carries cylindrical housing 39 having a spring 40 tensioned against a ball 41 carried by a semi-spherical retainer 42, ball 41 being received in groove 43 and depressions 44, 45, 46, 47, 48, and 49 of cap 50, so that the valve may be rotated by the movement of handle 37, which may be retained in suitable adjusted position by means of the dogging action of ball 41 in the depressions. Cap 50 is secured in position by the screws 51.

The valve is provided with a horizontal partition 52 and vertical partitions 53 and 54, thus forming an upper, or cold water, chamber, and a lower, or hot water, chamber. The hot water chamber communicates with the mixing chamber, which is enveloped by wall 30 through the space 53' between partitions 53 and 54. The wall 52 is sector-shaped, that is to say, it extends from one vertical partition 53 to the other vertical partition 54 and thus defines a passageway or space 53'. It is to be noted that this construction provides an annular hot water chamber for the lower chamber of the valve which is covered by a cold water chamber and which is provided with upstanding vertical walls 53 and 54 which are also in contact with the cold water. Thus it will be seen that if for any unusual condition or reason, steam should be furnished by the inlet pipe, such steam would be condensed by these cold walls and also would have to pass upwardly through a great thickness of cold water. It will be readily apparent that inasmuch as the cold water is first turned on that the cold water will build up in the cold water chamber and will overflow the partition walls 53 and 54 and fill the hot water chamber and that should steam be inadvertently supplied in place of hot water that this steam would have to pass through a large quantity of cold water, which would be constantly renewed, before it could come to the outlet opening. In this way scalding or dangerous discharge of steam under unusual conditions is wholly avoided. Further than this, in the normal operation of the valve under usual conditions, the hot water is caused to travel quite a distance over walls which contact with the cold water and that the hot water is not violently projecting upwardly through a very constricted space but is passed through the relatively large space 53' into the bottom of the mixing chamber in a gradual upwardly flowing manner and thus an intimate mixing of the hot water with the cold water necessarily results. Further than this the partition 52 as well as the vertical partitions 53 and 54 strengthen the conical valve walls as they form internal reinforces or braces for such walls. The upper part of wall 14 is provided with a plurality of apertures, aperture 55 being the largest, aperture 56 being three-quarters the size of aperture 55, aperture 57 being one-half the size of aperture 55, and aperture 58 being one-quarter the size of aperture 55.

On the movement of handle 37 any one of these apertures may be made to register with the opening in inlet nipple 12 for cold water. The lower part of wall 14 is provided with a series of apertures. Aperture 59 is the largest, aperture 60 is substantially three-quarters that of aperture 59, aperture 61 is substantially one-half, and aperture 62 is one-quarter that of aperture 59. Each of these apertures may be brought into registry with the opening in hot water inlet nipple 11.

When ball 41 is positioned in depression 44, the relative positions of the parts is as shown in Figures 7, 8, and 9. None of the apertures in the wall 14 is then in registry with an opening in an inlet nipple. Consequently no water is being fed. When handle 37 is moved in clockwise direction, as viewed in Figure 1, and ball 41 is positioned in depression 45, the parts have the relationship shown in Figures 10, 11, and 12, in which an aperture 55 is in communication with the opening in inlet nipple 12. At that time, no hot water is being admitted, but the cold water enters the cold water chamber, passes upwardly into the mixing chamber, and is ejected through outlet nipple 13. On the movement of handle 37 to the next succeeding position, ball 41 being received in depression 46, aperture 56 is in registry with the opening in inlet nipple 12 and aperture 62 is in registry with the opening in inlet nipple 11, as shown in Figures 13-15, so that hot water is being admitted to the hot water chamber, whence it passes upwardly through the space or passage 53' between partitions 53 and 54 and is received in the mixing chamber, together with the cold water. The water then discharged from outlet nipple 13 is slightly warmer than the coldest. When handle 37 is moved to the next position, ball 41 is received in depression 47 and water is being admitted through apertures 57 and 61, the proportions of hot and cold water being substantially equal. This relationship of parts is shown in Figures 16, 17, and 18.

On the moving of handle to the next succeeding position, shown in Figures 19, 20, and 21, the smallest degree of cold water is admitted and the hot water enters through opening 60. When handle 37 is moved to the next succeeding position (Figures 22-24), hot water is admitted through opening 59, but no cold water is being admitted.

During the movement of handle 37 from one position to another, the water is cut off as none of the apertures is in registry with an opening in inlet nozzles. It will be apparent, therefore, that the temperature of the resulting out-flow of water will be at all times within the control of the operator, who may get the coldest water, or any desired degree of hot water up to the maximum. The invention is not limited to the number of inlet apertures shown. These may be modified indefinitely and a mixing of water in the mixing chamber results in the out-flow of water at an even and uniform temperature, so that no discharge of scalding water results.

I claim:—

1. In a device of the class described, the combination of a casing having a mixing chamber, an opening for one liquid, an opening for another liquid, an exit opening, a valve having a chamber for the first liquid and a chamber for the second liquid, a plurality of apertures for each chamber, said chambers opening into said mixing chamber, and means for rotating the valve to present said apertures selectively to an inlet opening.

2. In a device of the class described, the combination of a casing having a mixing chamber, a cold water inlet opening, a hot water inlet opening, an exit opening, a valve, partitions in said valve forming a cold water chamber and a hot water chamber, and apertures in said valve adapted to be brought into registry with said inlet openings, whereby the cold water chills the walls of said hot water chamber.

3. In a device of the class described, the combination of a casing having a mixing chamber, an outlet opening, a cold water inlet opening, a hot water inlet opening, a valve wall having a plurality of apertures of gradually varying sizes adapted to register with said cold water inlet opening, a series of apertures of gradually varying sizes adapted to register with said hot water inlet opening, a partition forming cold water and hot water chambers, and means for rotating said valve wall to vary the relationship of said apertures with said openings, whereby a predetermined gradual and regular variation of the proportioning of hot and cold water is secured.

4. In a device of the class described, the combination of a casing having a mixing chamber, an outlet opening, a cold water inlet opening and a hot water inlet opening, a valve wall contacting with said casing and having a series of spaced apertures, each succeeding aperture being of larger size, each of said apertures being adapted to register with said cold water inlet opening, said valve wall also having a series of apertures, each of which is adapted to register with said hot water inlet opening, said last mentioned apertures being of successively larger size, a partition forming cold water and hot water chambers, and means for rotating said valve wall to varying relationship of said apertures and said openings, said hot water chamber being partially surrounded by cold water when said valve is operated.

In testimony that I claim the foregoing I have hereunto set my hand at Milwaukee, in the county of Milwaukee and State of Wisconsin.

JOHN A. ESSENSON.